United States Patent
Huang

(10) Patent No.: US 7,260,832 B2
(45) Date of Patent: Aug. 21, 2007

(54) PROCESS FOR PREVENTING VIRUS INFECTION OF DATA-PROCESSING SYSTEM

(75) Inventor: Hui-Chieh Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 1012 days.

(21) Appl. No.: 10/195,631

(22) Filed: Jul. 15, 2002

(65) Prior Publication Data

US 2003/0131248 A1    Jul. 10, 2003

(30) Foreign Application Priority Data

Jan. 9, 2002    (TW) .............................. 91100165 A

(51) Int. Cl.
*H04L 9/32*    (2006.01)
*H04L 9/00*    (2006.01)
*G06F 15/173*    (2006.01)

(52) U.S. Cl. ................... 726/2; 713/1; 713/2; 713/100; 713/164; 713/188; 726/3; 726/22; 726/23; 726/24; 709/223; 709/224; 709/225; 709/226; 709/229

(58) Field of Classification Search ................. 726/24; 713/1
See application file for complete search history.

(56) References Cited

U.S. PATENT DOCUMENTS

| | | | | |
|---|---|---|---|---|
| 5,349,655 A | * | 9/1994 | Mann | 714/6 |
| 5,408,642 A | * | 4/1995 | Mann | 714/38 |
| 5,559,960 A | * | 9/1996 | Lettvin | 726/24 |
| 5,598,531 A | * | 1/1997 | Hill | 726/24 |
| 5,826,012 A | * | 10/1998 | Lettvin | 726/22 |
| 6,098,171 A | * | 8/2000 | Johnson et al. | 726/16 |
| 6,185,678 B1 | * | 2/2001 | Arbaugh et al. | 713/2 |
| 6,347,375 B1 | * | 2/2002 | Reinert et al. | 726/24 |
| 7,010,696 B1 | * | 3/2006 | Cambridge et al. | 713/188 |
| 7,032,114 B1 | * | 4/2006 | Moran | 713/187 |

* cited by examiner

*Primary Examiner*—Ayaz Sheikh
*Assistant Examiner*—Jenise Jackson

(57) ABSTRACT

A process for preventing virus infection of a data-processing system with a startup apparatus is disclosed. The process includes steps of a) comparing a first specific information of the data-processing system with a second specific information of a software virus stored in a software-virus database by the data-processing system prior to executing a startup operation of the data-processing system, and b) allowing the startup apparatus to execute an anti-virus action according to a comparing result of the step a).

11 Claims, 5 Drawing Sheets

US 7,260,832 B2

PROCESS FOR PREVENTING VIRUS INFECTION OF DATA-PROCESSING SYSTEM

FIELD OF THE INVENTION

The present invention relates to a process for preventing virus infection, and more particularly to a process for preventing virus infection of a data-processing system prior to executing a startup operation.

BACKGROUND OF THE INVENTION

As Internet is becoming widely used and the environment where software is freely shared is popular, a variety of software viruses increasingly spread to invade stored information. For example, files in a computer or emails downloaded via personal digital assistants (PDAs) or mobile phones are likely to be damaged by software viruses. In order to reduce the damage of virus infection, a typical way is to employ virus-scanning software to detect and remove viruses. Such virus-scanning software is generally installed in operating systems, for example Windows 98/NT and OS2, and its virus-scanning action is downloaded and executed when the operating system is being started. Some viruses, for example a Trojan Horse virus and a Time Bomb virus, which attacks specially designated information such as date or time, will attack the computer system or the PDA before the virus-scanning software is installed and stored in a system memory. Therefore, some unwanted changes might be made to computer components by a virus, such as a change to stored information or the making of propagation copies of the virus.

SUMMARY OF THE INVENTION

Therefore, the present invention provides a process for preventing virus infection of a data-processing system, in which the date/time information likely to trigger specific software viruses to attack the data-process system can be avoided or automatically changed prior to executing a startup operation, so as to overcome the above problems.

In accordance with an aspect of the present invention, there is provided a process for preventing virus infection of a data-processing system with a startup apparatus. The process includes steps of a) comparing a first specific information of the data-processing system with a second specific information of a software virus stored in a software-virus database by the data-processing system prior to executing a startup operation of the data-processing system, and b) allowing the startup apparatus to execute an anti-virus action according to a comparing result of the step a).

Preferably, the data-processing system includes a personal computer, a personal digital assistant (PDA) and a mobile phone.

Preferably, the startup apparatus comprises a read only memory (ROM) having a micro-instruction set of basic input/output system (BIOS), and the micro-instruction set of BIOS is stored in the ROM in a form of firmware. The software-virus database is included in the micro-instruction set of BIOS.

Preferably, the software-virus database is updated manually or by downloading new software virus information from a website via Internet.

Preferably, the startup operation is executed by an operation system. Furthermore, the startup operation executes a virus-scanning action.

In an embodiment, the first specific information and the second specific information are an operating date of the data-processing system and an attacking date of the software virus, respectively. In another embodiment, the first specific information and the second specific information are an operating time of the data-processing system and an attacking time of the software virus, respectively.

In an embodiment, the anti-virus action is executed when the comparing result indicates no substantial difference exists between the first specific information and the second specific information. The anti-virus action includes a step of modifying the first specific information according to the second specific information. The anti-virus action further includes a step of revealing a virus-warning message.

In an embodiment, the anti-virus action is executed when the comparing result indicates a difference between the first specific information and the second specific information is within a preset range. The anti-virus action includes steps of revealing a virus-warning message and modifying the first specific information according to the second specific information.

In an embodiment, the startup operation executes a virus-scanning action.

Preferably, the anti-virus action further includes a step of changing the first specific information according to the second specific information. The virus-warning message is shown by one of a display and a light emitting diode indicator.

In accordance with another aspect of the present invention, there is provided a process for preventing virus infection of a computer system with a basic input/output system (BIOS) and an operation system (OS). The process includes steps of a) the BIOS determining whether a first specific information of the computer system conforms to a virus-related information, b) the BIOS executing an anti-virus action when the first specific information conforms to the virus-related information, and he OS executing a startup operation when the first specific information does not conform to the virus-related information.

In an embodiment, the first information is a true operating date of the computer system. The virus-related information is a premeditated attacking date of a software virus, and the first specific information conforms to the virus-related information indicates that the true operating date of the computer system is identical to the premeditated attacking date of the software virus. The anti-virus action is executed by changing the true operating date into a date later than the true operating date.

In an embodiment, the virus-related information is a range between the premeditated attacking date and a date a predetermined period ahead of the premeditated attacking date of the software virus, and the first specific information conforms to the virus-related information indicates that the true operating date of the computer system is within the range. The anti-virus action is executed by revealing a virus-warning message. Furthermore, the anti-virus action is executed by changing the true operating date into a date later than the true operating date.

In an embodiment, the virus-related information is a range between the premeditated attacking date and a date a predetermined period after the premeditated attacking date of the software virus, and the first specific information conforms to the virus-related information indicates that the true operating date of the computer system is within the range. The anti-virus action is executed by revealing a virus-warning message.

Preferably, the virus-scanning action is performed after or along with the startup operation.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
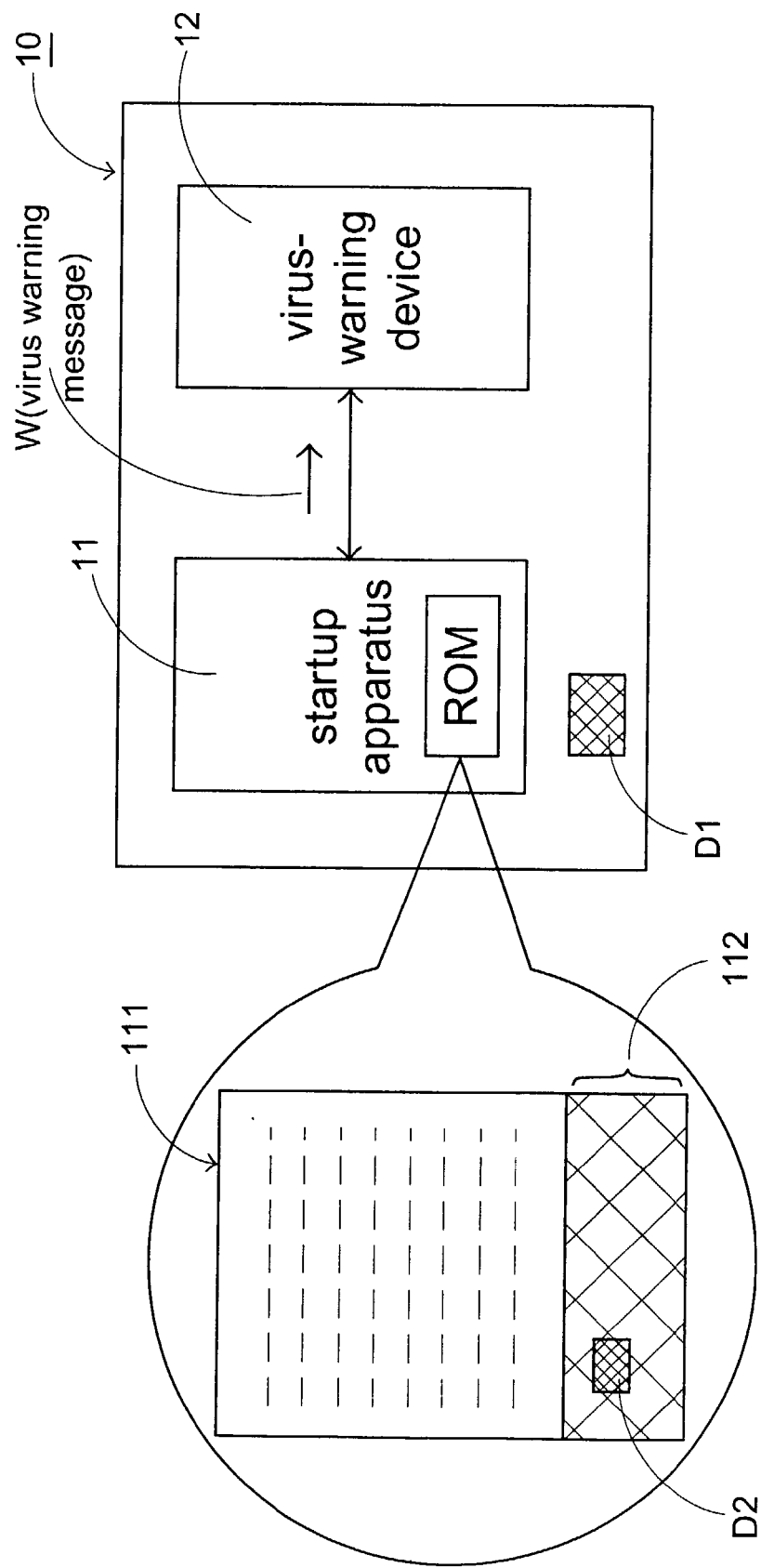
FIG. 1 is a schematic diagram illustrating hardware of a data-processing system where the present invention can be applied.

FIG. 1 schematically illustrates hardware of a data-processing system 10, in which a preferred process of the present invention is applied thereto. In accordance with the present invention, the data-processing system 10 includes, but not limited to, a personal computer, a personal digital assistant (PDA) and a mobile phone. The data-processing system 10 comprises a startup apparatus 11 and a virus-warning device 12.

The startup apparatus 11 comprises a read only memory (ROM) having a micro-instruction set of basic input/output system (BIOS) 111, and the micro-instruction set of BIOS 111 is stored in the ROM in a form of firmware, such that the data-processing system 10 is started by firmware instructions. The startup apparatus 11 further comprises a software-virus database 112, which is also provided in the micro-instruction set of BIOS 111. The software-virus database 112 can be either updated manually or by downloading new software virus information from a website via Internet. The virus-warning device 12 is electrically connected with the startup apparatus 11 for receiving a virus-warning message W from the startup apparatus 11 and then revealing such message. In accordance with the present invention, the virus-warning device 12 is implemented by a display or a light emitting diode (LED) indicator.

First of all, a first specific information D1 and a second specific information D2 are recorded in the data-processing system 10 and the software-virus database 112, respectively. The second specific information D2 relates to an attacking date and/or an attacking time of certain software virus such as a Trojan Horse virus and a Time Bomb virus. The first specific information D1 is a true operating date and/or a true operating time of the data-processing system 10.

Based on the above configuration, the process for preventing virus infection principally comprises the following steps 100:

(a) comparing the first specific information D1 with the second specific information D2 by the data-processing system 10 prior to executing a startup operation of the data-processing system; and (b) allowing the startup apparatus 11 to execute an anti-virus action according to a comparing result of the step (a).

In accordance with the present invention, the startup operation is executed by an operation system such as Windows 98/NT or OS2.

Figure 2A:
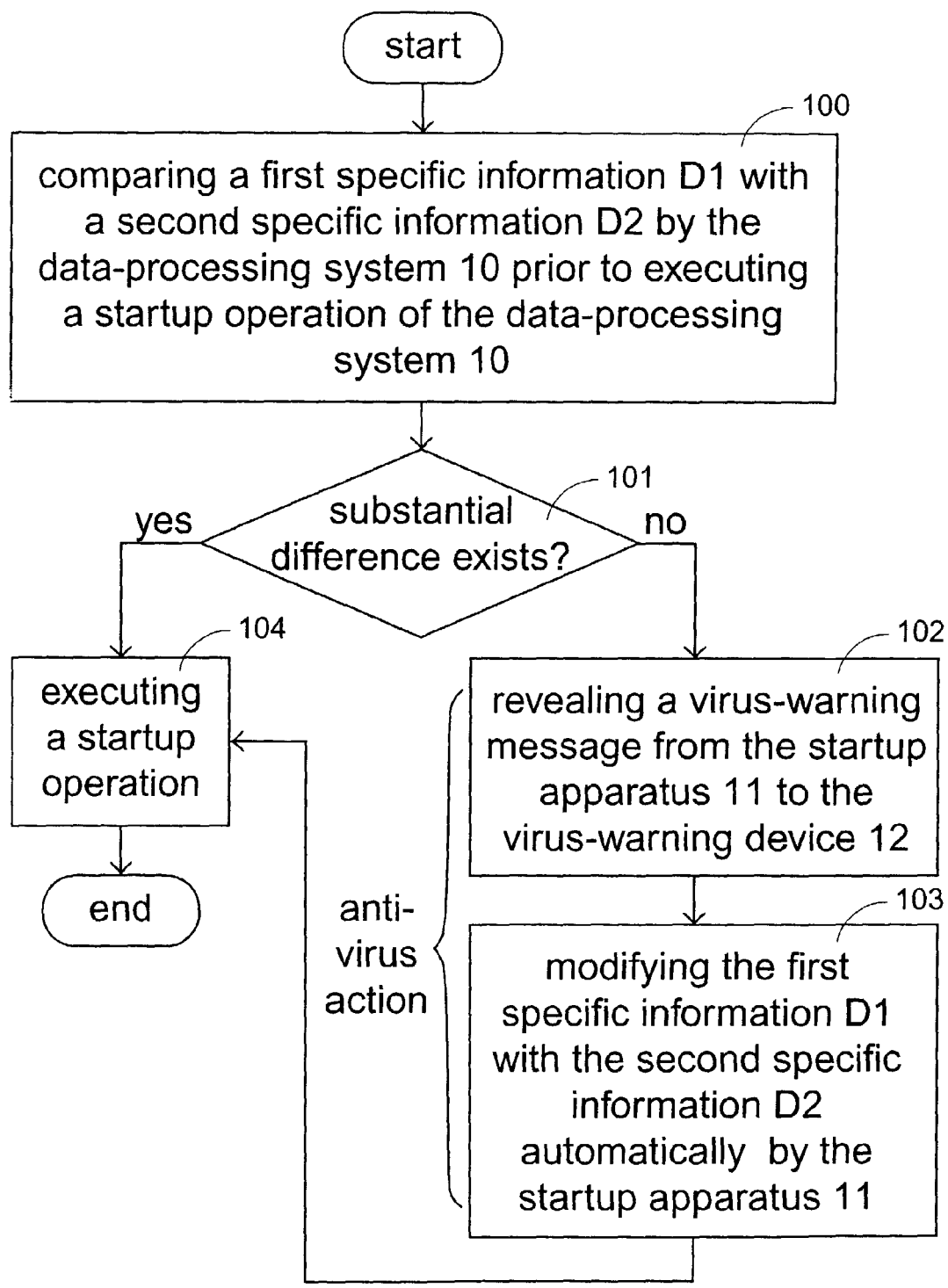
FIGS. 2(a) and 2(b) are flow charts of the processes according to a first and a second preferred embodiments of the present invention, respectively.
Figure 2B:
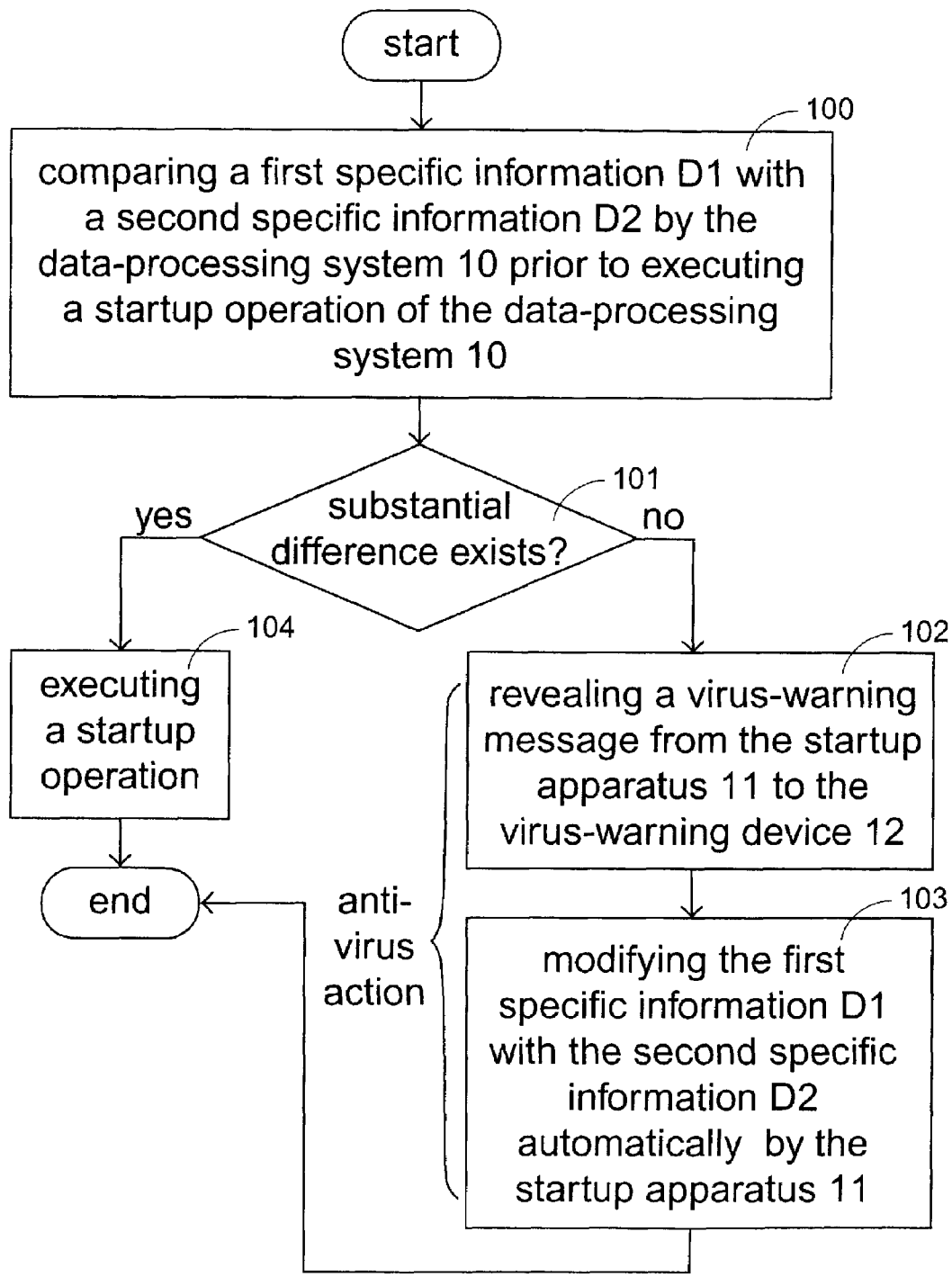

In order to illustrate the present process in details, flow charts according to a first and a second embodiments are shown in FIGS. 2(a) and 2(b). When the comparing result in the step 101 indicates there exists difference between the first specific information D1 and the second specific information D2, it means no monitored virus will act on the true operating date/time. Therefore, the startup operation can be directly executed in the step 104. On the other hand, when it is indicated that no substantial difference exists between the first specific information D1 and the second specific information D2, it means that a monitored virus may act on that true operating date/time, and an anti-virus action should be executed first. The anti-virus action includes a step 102 of revealing a virus-warning message from the startup apparatus 11 to the virus-warning device 12. The anti-virus action further includes a step 103 of modifying the first specific information D1 according to the second specific information D2 automatically by the startup apparatus 11. For example, the true operating date is changed into a date later than the true operating date. Of course, it is possible to design a system that only reveals the virus-warning message and leaves the decision right for further action to the user, which will be described later with reference to FIG. 3. Alternatively, it is also possible to design a system that directly modifies the first specific information D1 as mentioned above to avoid the attack of the virus without previously notifying the user. In other words, the step 102 can be omitted for some situations. Subsequently, the startup operation step 104 is executed (FIG. 2(a)) or otherwise the process is ended (FIG. 2(b)).

It is of course that the startup apparatus 11 can be placed outside but electrically connected to the data-processing system 10, and the software-virus database 112 can also be provided, independent from the micro-instruction set of BIOS 111, in any input port (not shown) of the data-processing system 10 in a form of firmware.

Figure 3:
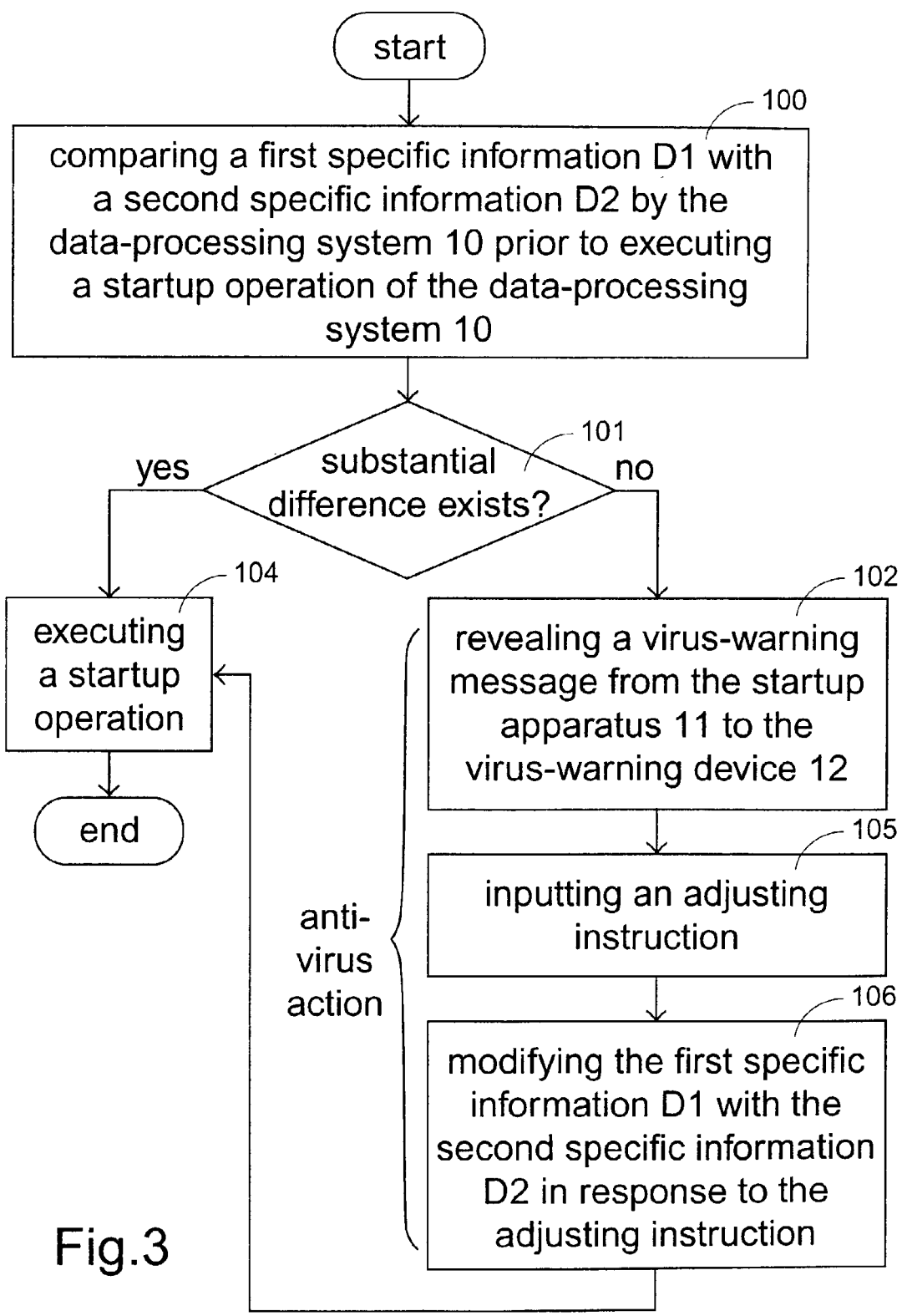
FIG. 3 is a flow chart of the process according to a third preferred embodiment of the present invention.

Referring to FIG. 3, a third preferred embodiment of the present invention is illustrated. The process is similar to the first preferred embodiment except that after the revealing step, the modifying step is not executed automatically. Instead, an adjusting instruction is inputted by the user in the step 105. The first specific information D1 is modified according to the second specific information D2 in response to the adjusting instruction in the step 106.

Figure 4:
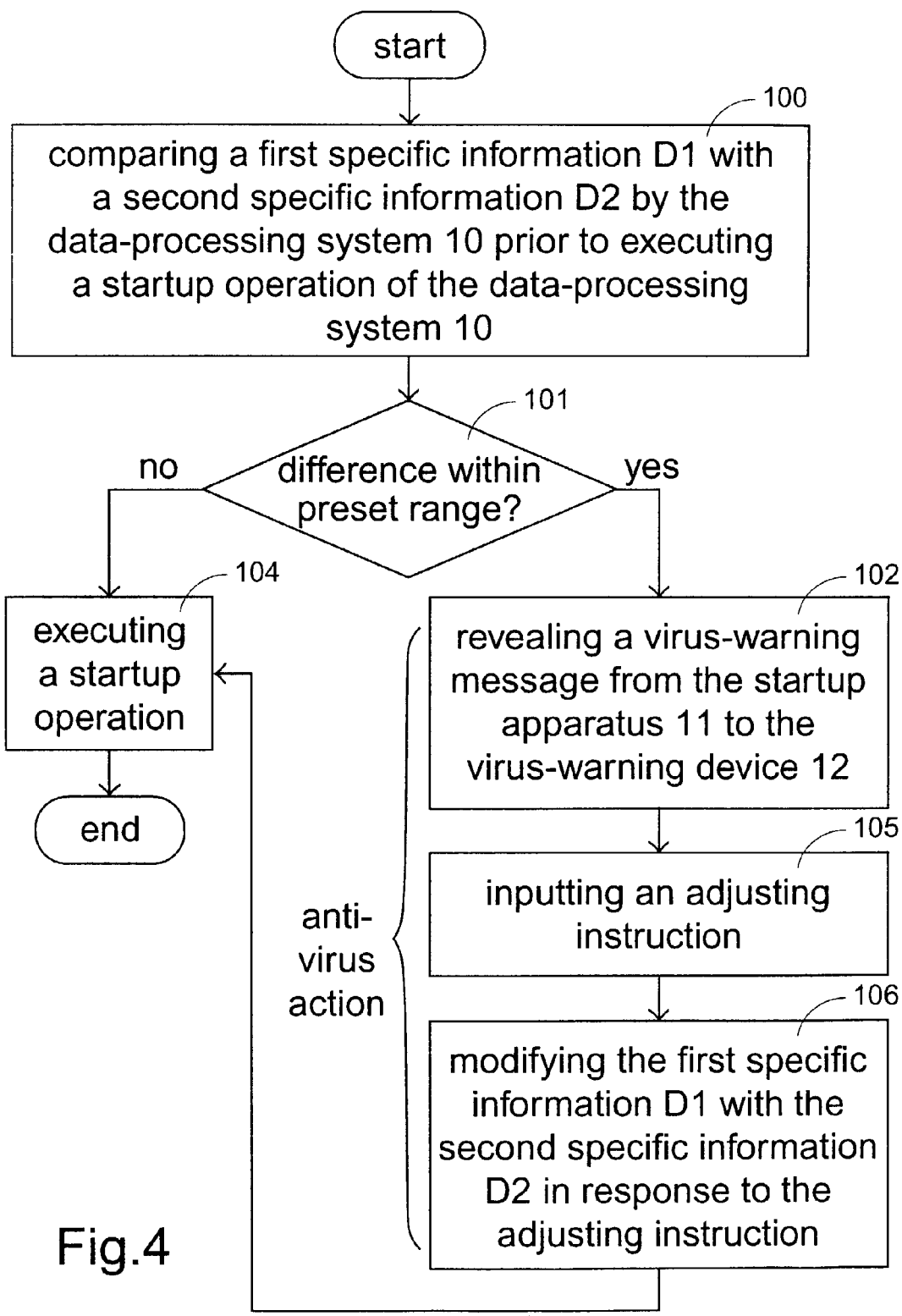
FIG. 4 is a flow chart of the process according to a fourth preferred embodiment of the present invention.

In another embodiment, as shown in FIG. 4, the anti-virus action is also executed when the comparing result indicates that a difference between the first specific information D1 and the second specific information D2 is within a preset range. Generally, the difference means that a predetermined period ahead of a premeditated attacking date of the software virus. The anti-virus action includes steps of revealing a virus-warning message and modifying the first specific information D1 to a date/time after the second specific information D2. It is of course that the startup operation can execute a virus-scanning action after or along with the startup operation.

Since certain date/time information likely to trigger specific software viruses to attack the data-process system is detected and an anti-virus action is executed prior to executing a startup operation, the possibility of virus infection of a data-processing system can be highly reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A process for preventing virus infection of a data-processing system, comprising steps of:
   determining whether a true operating date and/or time of said data-processing system conforms to a premeditated attacking date and/or time of a software virus, which is recorded in a software-virus database of said data-processing system, after said data-processing system is booted with a basic input/output system (BIOS) but before said data-processing system is started up with an operation system (OS);
   changing said true operating date and/or time to avoid virus attack when said true operating date and/or time conforms to said premeditated attacking date and/or time; and
   executing a startup operation of said OS when said true operating date and/or time does not conform to said premeditated attacking date and/or time.

2. The process according to claim 1 wherein said true operating date and/or time conforms to said premeditated attacking date and/or time when said true operating date and/or time of said data-processing system is identical to said premeditated attacking date and/or time of said software virus.

3. The process according to claim 1 wherein said true operating date and/or time is changed into a date later than said true operating date and/or time when said true operating date and/or time conforms to said premeditated attacking date and/or time.

4. The process according to claim 1 wherein said premeditated attacking date and/or time includes a range between a premeditated attacking date and a date a predetermined period ahead of said premeditated attacking date of said software virus, and said true operating date and/or time conforms to said premeditated attacking date and/or time when said true operating date and/or time of said data-processing system is within said range.

5. The process according to claim 1 further comprising a step of revealing a virus-warning message when said true operating date and/or time conforms to said premeditated attacking date and/or time.

6. The process according to claim 1 further comprising a step of executing a virus-scanning action after said startup operation.

7. The process according to claim 1 further comprising a step of executing a virus-scanning action along with said startup operation.

8. The process according to claim 1 wherein said data-processing system is selected from a group consisting of a personal computer, a personal digital assistant (PDA) and a mobile phone.

9. The process according to claim 1 wherein said data-processing system is booted with a micro-instruction set of basic input/output system (BIOS) stored in a read only memory (ROM), which is in a form of firmware.

10. The process according to claim 9 wherein said software-virus database is included in said micro-instruction set and updated manually or by downloading new software virus information from a website via Internet.

11. The process according to claim 5 wherein said virus-warning message is shown by a display or a light emitting diode indicator.

* * * * *